(12) United States Patent
Kennedy

(10) Patent No.: US 6,677,684 B1
(45) Date of Patent: Jan. 13, 2004

(54) AUXILIARY POWER GENERATOR

(76) Inventor: Gino W. Kennedy, 800 SE. 7$^{th}$ Ave., Pompano Beach, FL (US) 33060

( * ) Notice: Subject to any disclaimer, the term of this patent is extended or adjusted under 35 U.S.C. 154(b) by 16 days.

(21) Appl. No.: 09/603,725

(22) Filed: Jun. 23, 2000

(51) Int. Cl.$^7$ ................................................. H02P 9/04
(52) U.S. Cl. ..................... 290/4 C; 290/1 A; 290/1 R
(58) Field of Search ................................ 290/4 C, 1 A, 290/1 R; 123/2; 248/674, 200, 205.1, 226.11, 675, 677; 62/239, 243, 297, 236; 322/1; 180/65.4

(56) References Cited

U.S. PATENT DOCUMENTS

| | | | | |
|---|---|---|---|---|
| 422,886 A | * | 3/1890 | Shea ............................... 2/239 |
| 4,097,012 A | * | 6/1978 | McIntyre ..................... 224/540 |
| 4,540,888 A | * | 9/1985 | Drewry et al. ............... 290/1 R |
| 4,548,164 A | * | 10/1985 | Ylonen et al. ........... 123/195 C |
| 4,651,066 A | * | 3/1987 | Gritter et al. ................ 318/139 |
| 4,687,945 A | * | 8/1987 | Ebeling ..................... 290/37 R |
| 4,698,975 A | * | 10/1987 | Tsukamoto et al. ........... 60/721 |
| 4,896,734 A | * | 1/1990 | Horiuchi et al. ............. 180/68.3 |
| 5,035,397 A | * | 7/1991 | Yamada ....................... 180/297 |
| 5,040,493 A | * | 8/1991 | Gajewski et al. ......... 123/41.31 |
| 5,097,165 A | * | 3/1992 | Mashino et al. ............. 310/112 |
| 5,473,208 A | * | 12/1995 | Stihi ......................... 310/68 D |
| 5,642,702 A | * | 7/1997 | Kouchi et al. ........... 123/198 E |
| 5,686,773 A | * | 11/1997 | Skakibara et al. ............. 310/91 |
| 5,847,470 A | * | 12/1998 | Mitchell ..................... 180/65.2 |
| 5,907,970 A | * | 6/1999 | Havlovick et al. ............ 403/13 |
| 5,908,011 A | * | 6/1999 | Stauffer et al. ......... 123/198 E |
| 5,909,075 A | * | 6/1999 | Heimark ...................... 310/103 |
| 5,914,551 A | * | 6/1999 | Kern et al. .................... 310/91 |
| 5,944,298 A | * | 8/1999 | Koike ......................... 248/674 |
| 6,047,942 A | * | 4/2000 | Kennedy ..................... 248/674 |
| 6,098,950 A | * | 8/2000 | Zupan et al. ............ 123/195 A |
| 6,158,415 A | * | 12/2000 | Ichikawa et al. ....... 123/339.23 |
| 6,257,543 B1 | * | 7/2001 | Huelsmann ................. 248/638 |
| 6,313,543 B1 | * | 11/2001 | Frank ............................. 123/2 |
| 6,331,740 B1 | * | 12/2001 | Morohoshi et al. ....... 123/41.56 |
| 6,414,399 B1 | * | 7/2002 | Bianchi ...................... 290/1 A |

* cited by examiner

*Primary Examiner*—Nestor Ramirez
*Assistant Examiner*—Julio Gonzalez
(74) *Attorney, Agent, or Firm*—McHale & Slavin, P.A.

(57) ABSTRACT

An engine/generator assembly having the generator secured to the bottom of an engine. The assembly includes an engine/generator mounting plate which operates as a base plate between the generator and engine or in an alternatively embodiment as an oil reservoir base mount. The adaptation of the engine/generator allowing a tractor trailer to abide by the recently implemented tractor trailer regulations that prevent idling of the truck engine for extended periods of time.

8 Claims, 6 Drawing Sheets

AUXILIARY POWER GENERATOR

FIELD OF THE INVENTION

This invention relates to auxiliary power generators and, in particular, to an auxiliary power generator having the generator coupled directly to the bottom of an engine wherein the assembly provides a unique space saving configuration that can be placed in a cradle and secured to a frame rail of a semi-truck tractor trailer.

BACKGROUND OF THE INVENTION

Semi-truck tractor trailers are large over-the-road vehicles used for transporting a wide variety of items. Due to the long distances involved, operators typically sleep in the cab of the truck which eliminates the need for finding a motel, especially when only a short nap is necessary.

Semi-truck tractor trailers having a "bunk" or "sleeper" have become so common that most interstate fuel service stations provide parking areas and permit the drivers of such vehicles to sleep in their cab. The time and cost savings are obvious with ancillary benefits including security as the operator does not leave the trailer and its contents unattended.

Accordingly, the passenger area of the modern semi-truck is divided into a cab area and a bunk area. The bunk area is located directly behind the cab area and typically separated by a curtain or other divider. The bunk area includes a mattress and may include convenience items such as a stereo, television, VCR, refrigerator, coffee maker, even a microwave oven. While such items may run on DC, any drain on the truck batteries jeopardizes the engin starting ability. Due to the high compressions found in a diesel engine, such engines necessitate that the batteries are fully charged and possess high cold crank amperage. For these reasons the engine of a truck is left running when any of the above mentioned conveniences are utilized.

In addition to the running of an engine for conveniences, sleeping within the bunk area may demand that the engine is left running for the operator's comfort. By way of example, an operator may spend one night in Death Valley where the temperature stays above one hundred degrees and the next night be in the Rocky Mountains where the temperature could be below zero. An operator will need an air conditioner on the hot nights and a heater on cool nights, if any sleep is to be expected. Without electricity available to the bunk, the engine is left running wherein the cab air conditioner or. heater regulate the temperature in the bunk area.

Even if the driver is not in the vehicle, the engine may be left running. For example, if the tractor trailer is in an area that is not well lit, the lights on the vehicle may be left on to prevent another driver from accidentally hitting the vehicle. The numerous lights can quickly drain the batteries making it difficult or impossible to start an engine. Further, in cold environments a cold engine is harder to start and even if the batteries are fully charged, starting may be an issue.

Another problem arises in that while the large engines used in tractor trailers are efficient for pulling loads, there is no efficiency when using a large diesel engine to run a heater, air conditioner, battery charger and the like devices. In fact, the amount of energy produced per gallon of fuel while idling makes the operation of the diesel truck engine at idle most inefficient. Most problematic is that hundreds of thousands of semi-truck tractor trailers are idled everyday while the operator eats, sleeps or doing something other than driving. The amount of fuel consumed and pollution released prompted the Government to pass a law that prohibits operators from allowing their engines to idle while sleeping. This law is expected to be violated most frequently as it is human nature to take advantage of conveniences that are available and for an operator to sleep in a vehicle in temperatures 100 degrees or below 0 is not practical. In addition, the operation of a large engine can produce sufficient carbon monoxide to affect or even kill the operator while asleep.

It is generally accepted that an auxiliary generator for the production of AC is an ideal remedy for addressing the no-idling laws. By use of a generator, run by a small diesel engine, the assembly can draw fuel from an existing fuel tank and be sized to operate a peak efficiency. A self contained engine/generator system would be ideal for use with semi-trucks wherein conventional AC operated accessories, including air conditioners, can be used. In addition, the engine/generator can be used to power a battery charger, engine heater, or even be coupled to the truck engine recirculation system to maintain warm coolant in the large engine.

However, a conventional 1800 rpm in-line engine/generator assembly will not fit into the space configurations available with existing trucks. In fact, all known engine/generator combinations will not fit, or require extensive modification of the cab to accommodate the combination.

Further, conventional in-line engine/generator assemblies may weigh upwards of 500 lbs. This added weight may not be acceptable to a number of tractors whose trailer weight is nearing the legal limit. The additional weight over one axle can cause the truck axle weight to exceed legal limits.

The instant Inventor is a well known assembler of engine/generators and has been awarded patents for compact generators including U.S. Pat. Nos. 6,047,942 and 5,765,805 for use in the marine industry by providing a generator that is not only light in weight, but of a unique space saving configuration. However, even with the Inventor's unique space saving configurations, such devices are not readily adaptable to conventional semi-truck tractor trailers which have more height in a spacial environment than they do width.

Thus what is lacking in the art is a generator for use in conventional semi-truck tractor trailers that takes advantage of the height environment and provides all the benefits of a side by side generator system.

SUMMARY OF THE INVENTION

The instant invention is an engine/generator assembly designed specifically for semi-truck tractor trailer applications. The assembly employs a conventional engine having a generator rigidly mounted beneath the engine with a synchronized belt drive therebetween. The assembly is sized for securement to at least one frame rail by use of cradle, or the like structure, that is secured to the frame rail in a similar manner as an auxiliary fuel tank or storage box.

The generator position allows for placement of isolation mounts along the center of the assembly. The placement of the isolation mounts optimize weight distribution as the generator is placed beneath the engine, thus beneath the isolation mounts. Unique to the assembly is that the engine as uninhibited access when the generator is positioned beneath the engine, as compared to being in-line.

Securement of the engine and generator is accomplished by use of either a common base mount or a base mount that is modified to further operate as an oil reservoir. In the first embodiment, the engine is bolted to the top of the base mount and the generator is bolted to the bottom of the base mount. The base mount can then be secured to a cradle that is coupled to the frame rail. Preferably the base mount includes isolation mounts in securement to the cradle, alternatively the engine may include support brackets with isolation mounts for securement to the cradle.

In an alternative embodiment, the engine oil reservoir operates as the base mount, wherein the generator is bolted directly to the oil reservoir and thus to the bottom of the engine. The isolation mounts are secured to the oil reservoir for coupling of the assemble to a frame mounted cradle. The use of a modified oil reservoir allows the designer to take advantage of the available height if placing the engine at a particular height is desirable, or placing the generator at a preferred depth is desirable.

Accordingly, it is an objective of the instant invention to provide an auxiliary engine/generator assembly in an over-under configuration that can be placed in a cradle and secured to a frame rail, taking less space then an auxiliary fuel tank or storage box.

It is yet another objective of the instant invention to provide an engine/generator configuration that allows uninhibited access to the engine and allows for even weight distribution to isolation mounts.

Still another objective of the instant invention is to provide a compact generator set which eliminates the need for a common horizontal bed plate providing a direct and rigid coupling of a generator to an engine wherein the use of a synchronized sprocket eliminates the need for belt adjustment.

Another objective of the instant invention is to disclose the use of an oil reservoir that allows for securement of the generator and isolation mounts directly to the oil reservoir.

Yet still another objection of the instant invention is to disclose an engine/generator assembly that is no wider than the engine unit, is light in weight, and will fit most conventional semi-trucks without modification to the truck.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
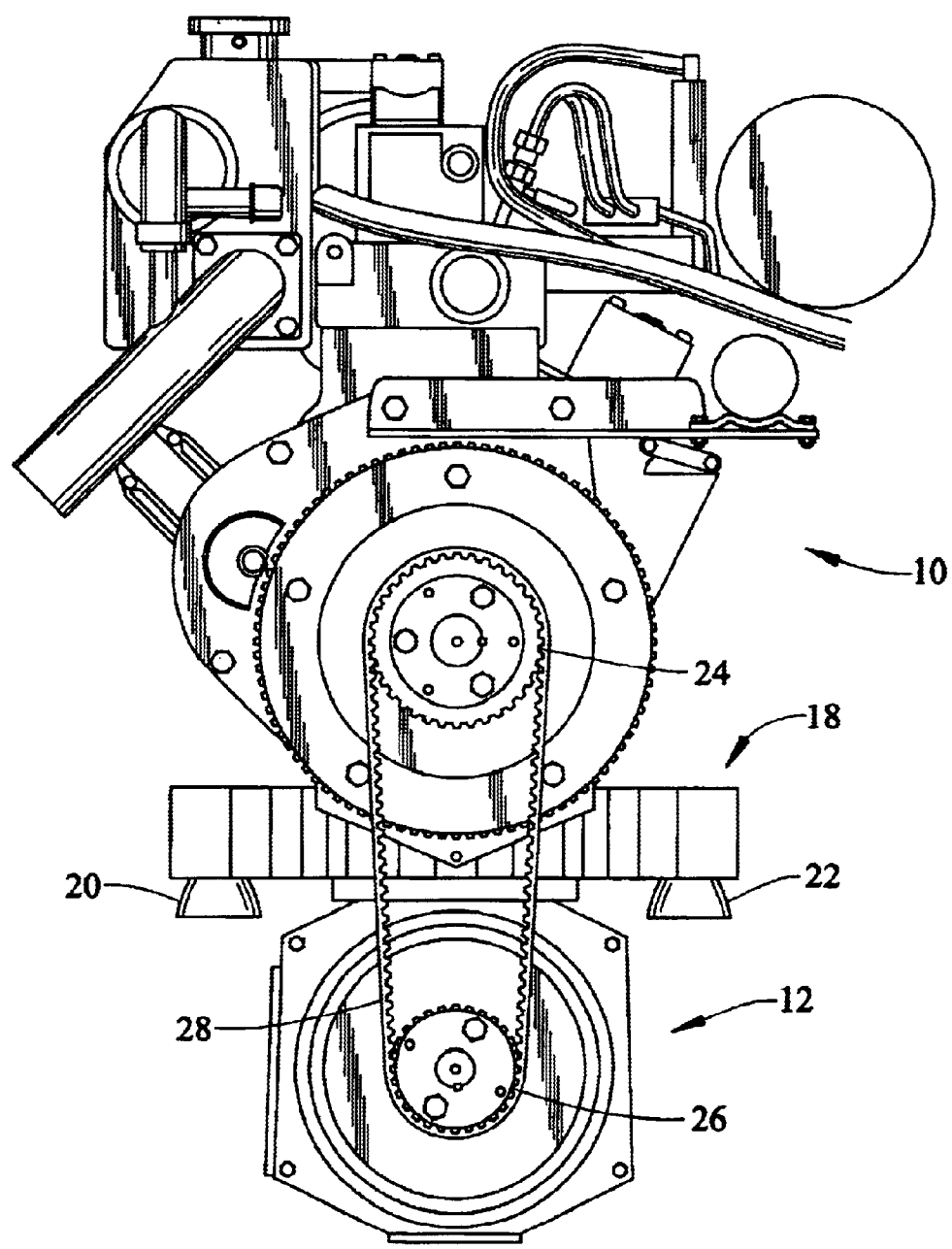
FIG. 1 is a front plane view of an engine/generator assembly having a one piece integrated oil pan.

Now referring to FIG. 1 set forth is a conventional diesel engine 10, a preferred embodiment of this invention directed to the Kubota diesel engine having an output range between 5 to 20 horsepower. This invention is directed to, although not limited to, the vertical four cycle liquid cooled diesel engine having a centrifugal fly wheel mechanical type governor as sold under Kubota Models Z42-E;D662-E;D722-E; and the like. A generator assembly 12 is positioned directly beneath the engine 10 and the assembly secured to semi-truck frame rail spacing by use of an enlarged oil reservoir 18. In this embodiment, the oil reservoir 18 can be increased or decreased in width providing a vertical spacing as small as twelve inches in width, to any size as necessary for mounting.

The enlarged oil reservoir provides an ancillary benefit of allowing oil change intervals to extend to over 500 hours.

The oil reservoir 18 is secured to the engine 10 in a conventional manner and simply replaces the original oil pan. However, the oil reservoir is modified to allow structural integrity in the securement of the generator 12 in an inverted position. Isolation mounts 20 and 22 are also mounted to the oil reservoir which in turn allows securement to a cradle illustrated later in this specification.

The direct coupling of the generator 12 to the oil reservoir provides rigidity and allows for the use of an engine mounted synchronized sprocket 24 for rotation of a generator mounted synchronized sprocket 26 by a flexible belt 28. The result is a engine/generator assembly that takes up no larger footprint than the engine itself and is capable of producing 5 KW with overall dimensions less than 15 inches wide, with about 17 inches located above the isolation mounts 20, 22 and about 10 inches located below the isolation mounts 20, 22.

Thus, in a primary embodiment, the generator set assembly employs the internal combustion engine 10 which is secured to a modified engine reservoir 18 which in turn is available for securing a generator 12. The engine reservoir 18 provides structural integrity for support of the generator 12, allowing absolute rigidity between the engine 10 and generator 12, and allows for coupling directly to a cradle by use of isolation mounts 20 and 22.

The isolation mounts 20, 22 are positioned according to the spacial distance of a cradle opening and is typically sized to accommodate the generator, or larger capacity oil reservoir if employed. The generator set assembly operates on diesel fuel with a horsepower displacement about 5 hp to about 20 hp operating within a range of about 1800 rpm to about 3600 rpm, preferably between 2600 and 2800 rpm. The generator set assembly produces between 2 and 10 KW electrical power.

Figure 2:
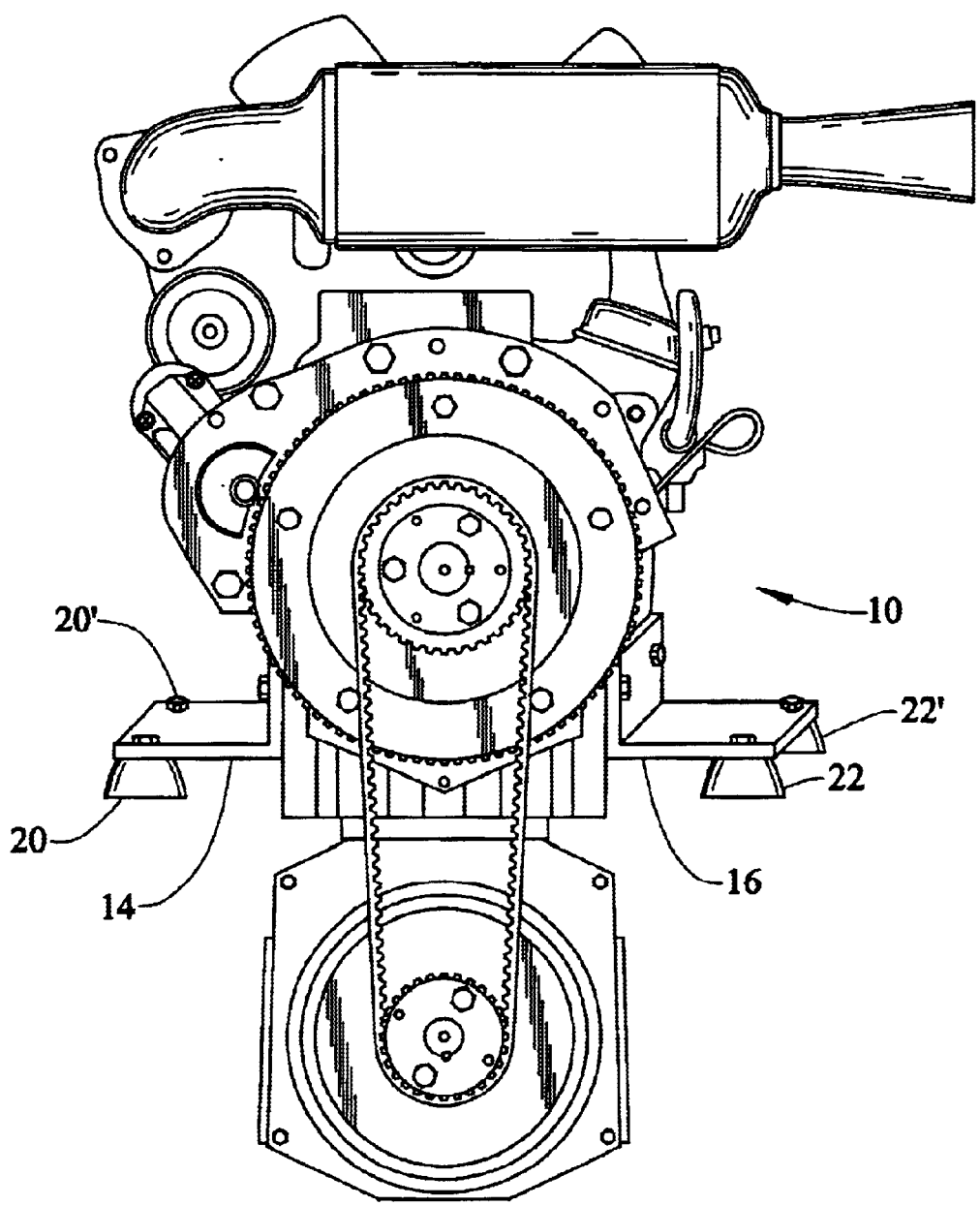
FIG. 2 is a front perspective view of an engine/generator assembly having an integrated oil pan with engine brackets.
Figure 3:
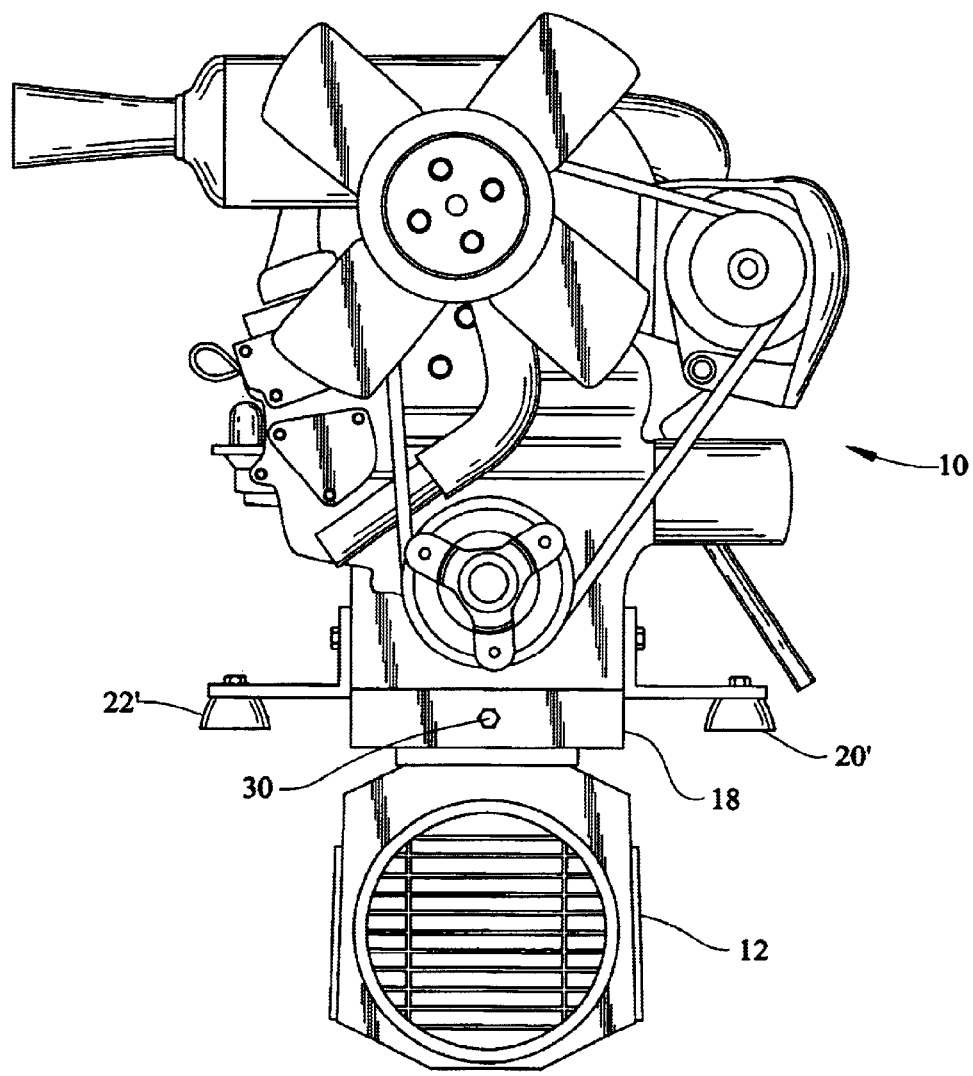
FIG. 3 is a back view of an engine/generator assembly of FIG. 2.

As shown in FIG. 2, the engine 10 can also be mounted to L-shaped brackets 14 and 16 which may run approximately the length of the engine, each having forward and rear isolation mounts 22 and 22' for securement to a cradle. Isolation mounts 20, 22' provide vibration control and accommodate torque starting without placing undue stress upon the assembly. The brackets 14 and 16 each have a vertical member with mounting holes positioned for securing to a side of the engine and a horizontal member with mounting holes available for securing to at least one isolation mount which is then secured to a cradle and coupled to a frame rail. FIG. 3 depicts the back side of the engine 10 with generator assembly 12 located beneath the engine and secured to the oil reservoir 18. This embodiment of the engine oil reservoir mount can be clearly depicted in this view having oil drawn bolt 30 available for maintenance.

Figure 4:
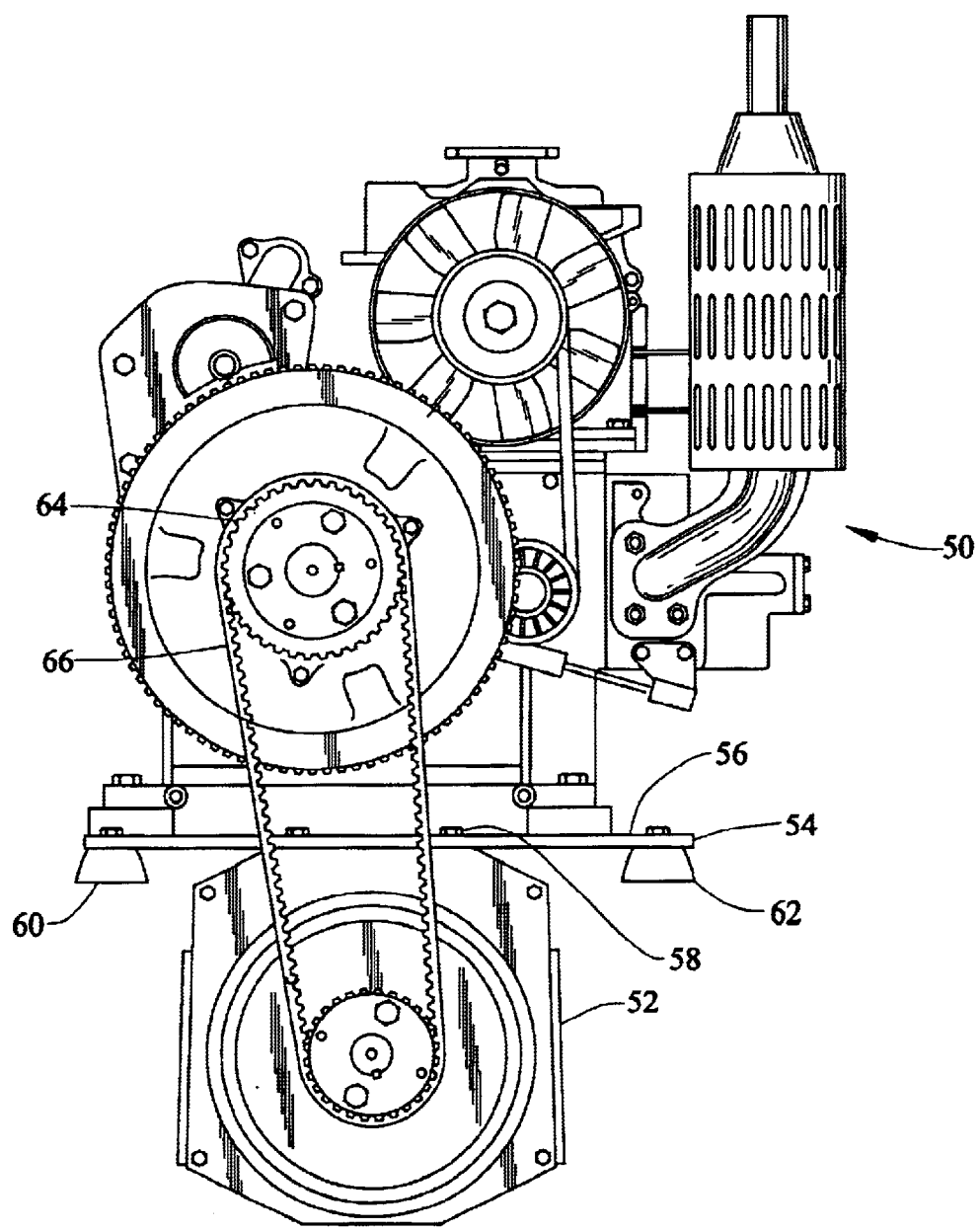
FIG. 4 is a front view of an engine/generator assembly having a base plate.

Referring now to FIG. 4, set forth is an alternative embodiment having a horizontal engine 50, such as an EA 300, located above the generator assembly 52. Engine/generator mounting plate 54 has an upper surface 56 for mounting of the engine 50 thereto and a lower surface, not shown, available for mounting the generator unit 52 by bolts 58. The mounting plate 54 is sized to allow placement into a cradle or storage box that is secured to a truck frame rail. Isolation mounts 60 and 62 address vibration by isolating the mounting plate 54 from the cradle. As with the previous embodiments, a synchronized sprocket 64 is used for rotation of a flexible belt 66 which again provides rotational action of synchronized sprocket 68 on the generator. 3 KW can be produced from an engine/generator assembly having less than 25 inches in height and 15 inches in width. In this embodiment, the generator set assembly is again designed on a cradle which is secured to a frame rail of a semi-truck.

It should be noted that the mounting plate may be shaped so as to eliminate the need for a cradle. Further, the base plate may be U-shaped allowing the use of a conventional oil reservoir by allowing the engine to couple to a top portion of the U-shaped base plate and the generator unit coupled to a lower portion of the U-shaped base plate. The unit then secured to the frame rail, or to a cradle for securement to the frame rail.

Figure 5:
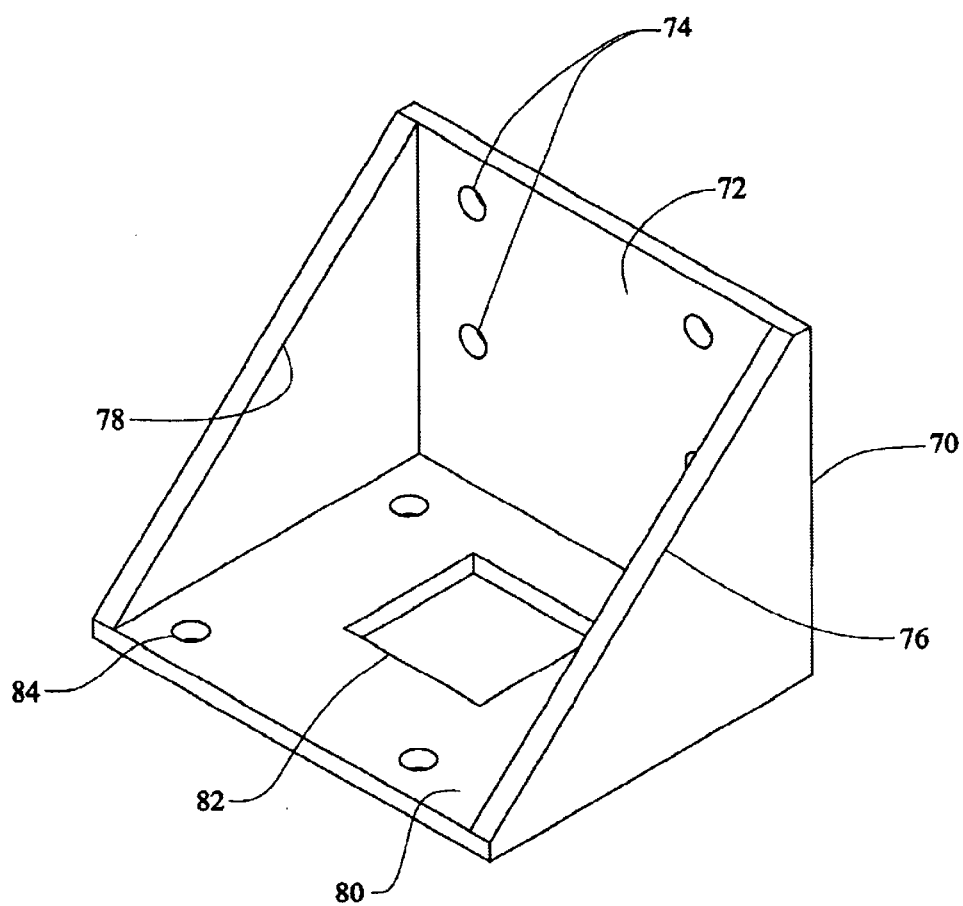
FIG. 5 is a perspective view of a cradle.

Shown in FIG. 5 is a cradle 70 having a back plate 72 that can be bolted to a frame rail by placement of securement bolts through bolt holes 74. A bottom plate 80 is cantilevered from the back place 72 and reinforced by support members 76 and 78. The bottom plate 80 has a centrally located aperture 82 for placement of the generator with bolt holes 84 available for securement of the isolation mounts.

Figure 6:
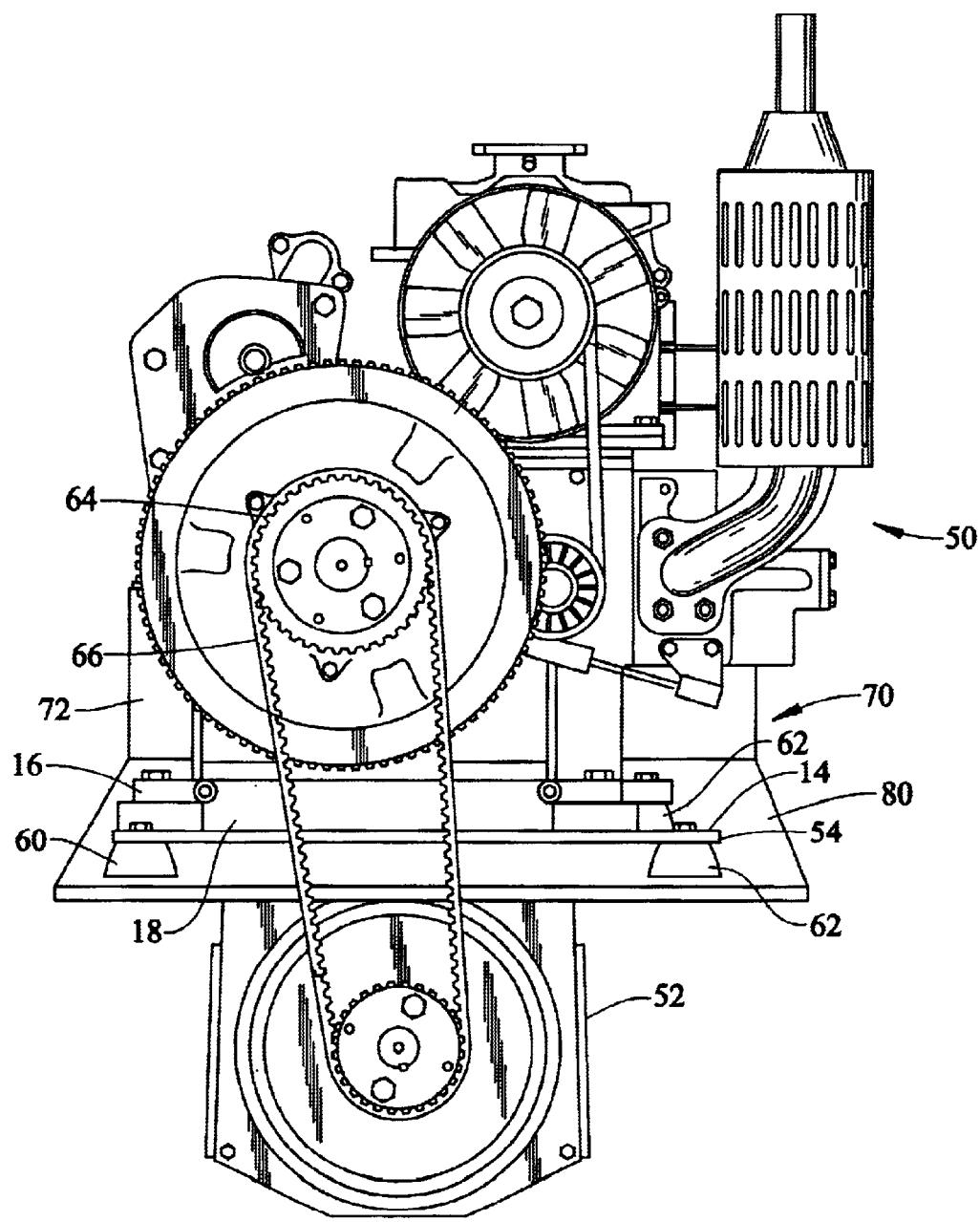
FIG. 6 is an end view the engine/generator assembly with cradle and brackets.

In FIG. 6, the cradle 70 is shown with the back plate 72 at the opposite end of the engine and the bottom plate 80 cantilevered under the engine. The back plate is connected to the frame of the vehicle (not shown) and the bottom plate supports the isolation mounts 60 and 62 on either side of the engine. The isolation mounts are connected to the engine by brackets 14 and 16. In this manner, the vibration is lessened between the cradle and the vehicle frame.

It is to be understood that while I have illustrated and described certain forms of my invention, it is not to be limited to the specific forms or arrangement of parts herein described and shown. It will be apparent to those skilled in the art that various changes may be made without departing from the scope of the invention.

What is claimed is:

1. A generator set assembly for a semi-truck, said generator set assembly comprising: an internal combustion engine; an engine/generator mount having an engine side surface and a generator side surface, said engine side surface available for securing to the bottom of an engine in a horizontal orientation, said generator side surface available for securing a generator in an inverted horizontal orientation; isolation mounts secured to said engine/generator mount; and a cradle for operatively securing said assembly, said cradle having a vertical back plate connected to a horizontal bottom plate, said bottom plate provided with an aperture sized to accommodate said generator, said bottom plate attached to said isolation mounts wherein said engine includes an oil reservoir on said bottom of said engine, said oil reservoir located between said engine and said generator, said oil reservoir formed as said engine/generator mount with said isolation mounts secured thereto.

2. A generator set assembly for a semi-truck, said generator set assembly comprising: an internal combustion engine; an engine/generator mount having an engine side surface and a generator side surface, said engine side surface available for securing to the bottom of an engine in a horizontal orientation, said generator side surface available for securing a generator in an inverted horizontal orientation; isolation mounts secured to said engine/generator mount; and a cradle for operatively securing said assembly, said cradle having a vertical back plate connected to a horizontal bottom plate, said bottom plate provided with an aperture sized to accommodate said generator, said bottom plate attached to said isolation mounts including a bracket means for securing said engine to said cradle wherein said isolation mounts are secured to said bracket means.

3. The generator set assembly according to claim 1 wherein said engine and said generator are rotatably connected together by a non-adjustable belt.

4. The generator set assembly according to claim 1 wherein said engine operates on diesel fuel with a horsepower displacement about 5 hp to about 20 hp operating within a range between 1800 and 3600 rpm.

5. The generator set assembly according to claim 1 wherein said generator produces between 2 KW and 10 KW electrical power.

6. The generator set assembly according to claim 2 wherein said engine and said generator are rotatably coupled together by a synchronous belt driven by a sprocket secured to said engine and said generator.

7. The generator set assembly according to claim 2 wherein said engine operates on diesel fuel with a horsepower displacement about 5 hp to about 20 hp operating in a range about 2600 rpm to 2800 rpm.

8. The generator set assembly according to claim 2 wherein said generator produces between 2 and 10 kw electrical power.

* * * * *